United States Patent [19]

Danielson

[11] Patent Number: 4,920,786

[45] Date of Patent: May 1, 1990

[54] METHOD OF RETROFITTING EXISTING FUEL TANKS

[76] Inventor: Ricky E. Danielson, 14925 Brookside Cir., Omaha, Nebr. 68144

[21] Appl. No.: 348,379

[22] Filed: May 8, 1989

[51] Int. Cl.⁵ .............................................. G01M 3/32
[52] U.S. Cl. ....................................... 73/49.2; 220/403
[58] Field of Search .................. 73/49.2; 220/1 B, 403; 405/54

[56] References Cited

U.S. PATENT DOCUMENTS

| | | |
|---|---|---|
| 2,953,276 | 9/1960 | Dunn . |
| 3,848,765 | 11/1974 | Dürkop ............................. 220/9 A |
| 3,995,472 | 12/1976 | Murray ............................ 73/49.2 X |
| 4,651,893 | 3/1987 | Mooney ............................. 220/445 |
| 4,685,327 | 8/1987 | Sharp ................................. 73/49.2 |
| 4,696,186 | 9/1987 | Sharp ................................. 73/49.2 |
| 4,739,895 | 4/1988 | Bachmann ......................... 220/5 A |
| 4,787,772 | 11/1988 | Wagner ........................... 73/49.2 X |
| 4,796,676 | 1/1989 | Hendershot et al. ................. 141/83 |
| 4,825,687 | 5/1989 | Sharp ................................. 73/49.2 |

FOREIGN PATENT DOCUMENTS

| | | |
|---|---|---|
| 2141041 | 2/1973 | Fed. Rep. of Germany ....... 73/49.2 |
| 2329525 | 1/1975 | Fed. Rep. of Germany ....... 73/49.2 |

*Primary Examiner*—Hezron E. Williams
*Assistant Examiner*—Joseph W. Roskos

[57] ABSTRACT

The method of preventing leakage from, or leakage into, an underground fuel storage tank comprising the steps of: positioning a flexible liner adjacent the interior surface of the tank so as to create a flow path between the liner and the tank towards a leak monitoring cable; and applying an epoxy material to the interior surface of the liner to maintain the liner in position.

5 Claims, 1 Drawing Sheet

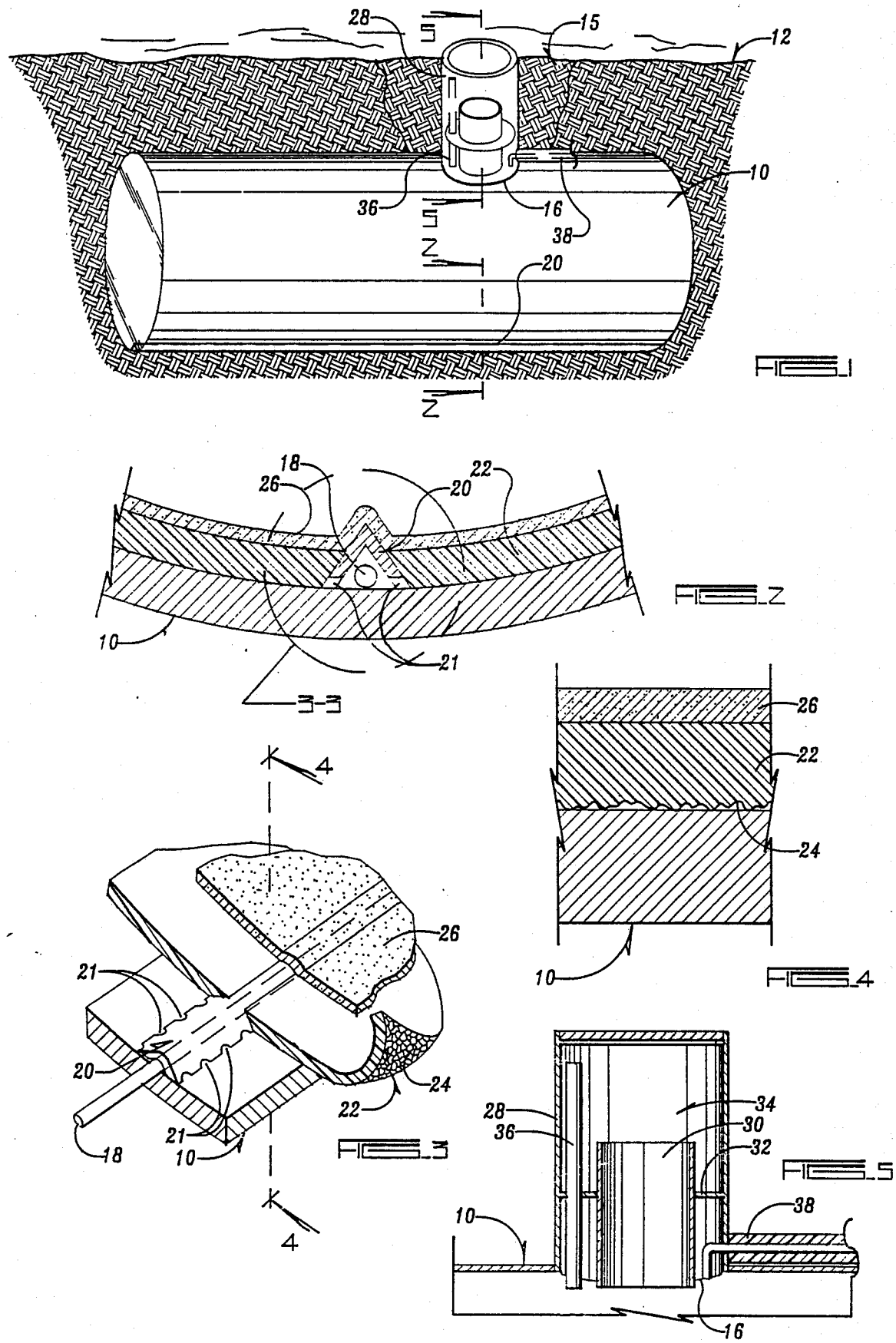

METHOD OF RETROFITTING EXISTING FUEL TANKS

BACKGROUND OF THE INVENTION

This invention relates to the method by which the interior of an underground fuel tank may be lined to enable leak monitoring thereof and to prevent ground water from entering the tank and for preventing fuel from passing into the ground.

The problem of leaking underground fuel storage tanks has become immense and one of national concern. If a crack develops in the metal storage tank, ground water can enter the tank and mix with the fuel. A more serious problem is that if a crack or leak develops in the fuel storage tank, the fuel from the tank will pass outwardly therefrom and will contaminate the ground around the tank as well as the ground water near the tank.

One solution to the problem is disclosed in U.S. Pat. No. 4,796,676 wherein a system is disclosed which includes a flexible liner positioned within the interior of the tank and including a negative pressure or vacuum system for drawing the flexible liner into close association with the interior wall surface of the metal storage tank. The requirement that a vacuum always be present to maintain the liner against the interior of the storage tank requires extensive apparatus and maintenance in itself. Further, it is not easy to install such a negative pressure or vacuum system on tanks that are already positioned within the ground.

Therefore, it is a principal object of the invention to provide an improved method for preventing leakage from an underground fuel storage tank.

A further object of the invention is to provide a method of preventing leakage from an underground fuel storage tank wherein a flexible thermoplastic liner is maintained in position adjacent the interior wall surfaces of the metal storage tank by means of a polyester resin material.

A further object of the invention is to provide a method of preventing leakage from an underground fuel storage tank and including a leak-monitoring means associated therewith.

Still another object of the invention is to provide an underground fuel storage tank including means associated therewith for preventing leakage therefrom and for monitoring leaks.

Still another object of the invention is to provide a method by which an underground fuel storage tank may be retrofitted so as to prevent leakage therefrom.

These and other objects of the present invention will be apparent to those skilled in the art.

BRIEF DESCRIPTION OF THE DRAWINGS

FIG. 1 is a partial perspective view of an underground tank which has been retrofitted by the method of this invention;

FIG. 2 is a sectional view seen on lines 2—2 of FIG. 1;

FIG. 3 is an exploded perspective view of area 3—3 of FIG. 2;

FIG. 4 is a sectional view seen on lines 4—4 of FIG. 3; and

FIG. 5 is a sectional view seen on lines 5—5 of FIG. 1.

SUMMARY OF THE INVENTION

The method of retrofitting an existing underground fuel storage tank is described. The ground around the fill pipe for the underground fuel storage tank is first excavated and an enlarged access opening is created in the tank which has a sufficient diameter to permit a person to enter the interior of the tank. A leak monitoring cable is positioned at the bottom of the tank along the entire length thereof and is covered with an inverted V-shaped channel having perforations formed therein to permit any fluid adjacent thereto to enter the interior thereof so as to be sensed by the leak-monitoring cable. A flexible PVC liner, having a textured outer surface, is then positioned adjacent the interior surface of the tank and is held in position by means of a polyester resin material. The access opening is closed by suitable means and the ground is then replaced around the fill pipe and associated structure. In the event that the tank should develop a leak so as to permit ground water to enter the interior thereof, the ground water will be directed towards the leak monitoring cable by means of flow channels provided at the exterior surface of the liner by the textured surface so that the leak monitoring cable will alert the operator to the fact that a leak has occurred. If the liner should develop a leak, the fuel will also be channeled or directed to the leak-monitoring cable so that the operator will also be alerted.

DESCRIPTION OF THE PREFERRED EMBODIMENT

Referring to the drawings, the numeral 10 refers to an underground storage tank which has been positioned beneath ground level 12. Tank 10 normally has a fill pipe extending upwardly therefrom to ground level to permit fuel to be placed within the storage tank. If the tank 10 should develop a leak or if it is desired to prevent the leakage of the tank, the tank may be retrofitted as follows.

The ground is first excavated around the fill pipe at an area generally indicated by the reference numeral 15. A large access opening 16 is then created in the tank 10 which is sufficiently large enough to permit a man to enter the interior of the tank. A conventional leak-monitoring cable 18 is then positioned at the bottom of a tank along the entire length thereof. An inverted V-shaped channel member 20 is then positioned over the cable and is provided with a plurality of perforations or openings 21 formed therein so that any fluid adjacent thereto will enter the interior of the channel member 20 and come into contact with the cable 18.

The interior surface of the tank is then lined with a flexible thermoplastic sheet member 22 adjacent the interior surface of the tank 10. Preferably, the sheet member 22 is comprised of a polyvinyl chloride member having a thickness of approximately 1/16 to ⅛ inch. The exterior surface of the sheet material 22 is textured to provide a plurality of flow channels 24 to provide a leak path or flow path between the exterior surface of the sheet material 22 and the interior surface of the tank 10.

The sheet material 22 is maintained in position adjacent the interior surface of the tank 10 by spraying a polyester resin material 26 onto the interior surface of the sheet material 22. The polyester resin material 26 not only maintains the sheet material 22 in position but also provides additional insurance against leakage. A suitable material 26 is a polyamine epoxy manufactured by Keeler and Long, Inc. of Watertown, Connecticut under the designation #3200 Epoxy self-priming surface enamel.

A large cylindrical member 28 is then secured to the tank 10 around the access opening 16 as illustrated in the drawings. A smaller cylindrical member 30 is welded or otherwise secured to the tank 10 around the created access opening as illustrated in the drawings. An overfill sub-floor member 32 is then positioned around the cylindrical member 30 to create an overfill compartment 34. Fill pipe 36 is also provided with the upper portion thereof being positioned below the upper portion of cylindrical member 28. A secondary containment piping apparatus 38 is also provided as seen in the drawings.

Thus, it can be seen that a novel system or method has been provided for retrofitting an existing underground storage tank with a flexible polyvinyl sheet member to create a liner at the interior surface of the tank with means being provided between the liner and the tank to create a leak path or flow path to insure that any fluid positioned therebetween will flow to the leak-monitoring cable 18. The fact that the sheet member or liner 22 is held in position by the polyester resin material as described eliminates the need for an expensive vacuum system such as required by the prior art patent discussed hereinabove.

Thus it can be seen that the invention accomplishes at least all of its stated objectives.

I claim:

1. The method of preventing leakage from or into an underground fuel storage tank having a fill pipe extending upwardly therefrom to ground level, comprising the steps of:

creating an access opening in said tank to permit a person to enter the interior of the tank;

placing a leak monitoring means at the bottom of the tank for sensing the presence of fluids;

positioning a flexible liner means adjacent the interior wall surfaces of the tank to create a flow path therebetween so that any fluid between the exterior of the liner means and the interior wall surface of the tank will flow downwardly towards said leak monitoring means, said flow path being created by a textured outer surface of said liner;

applying a material to the interior surface of said liner means to maintain said liner means in position adjacent the interior wall surfaces of said tank;

and closing said access opening.

2. The method of claim 1 wherein said liner'means is comprised of a thermoplastic material.

3. The method of claim 1 wherein said material at the interior surface of said liner means comprises an epoxy means.

4. The method of preventing leakage from or into an underground fuel storage tank having a fill pipe extending upwardly therefrom to ground level, comprising the steps of:

creating an access opening in said tank to permit a person to enter the interior of the tank;

positioning an inverted V-shaped perforated channel along the bottom length of said tank;

placing a leak monitoring means within said perforated channel for sensing the presence of fluids;

positioning a flexible liner means adjacent the interior wall surfaces of the tank to create a flow path therebetween so that any fluid between the exterior of the liner means and the interior wall surface of the tank will flow downwardly towards said leak monitoring means;

applying a material to the interior surface of said liner means to maintain said liner means in position adjacent the interior wall surfaces of said tank;

and closing access opening.

5. A means for preventing leakage of an underground fuel storage tank comprising:

an elongated leak monitoring cable positioned along the bottom of the tank, an inverted V-shaped channel positioned over said cable, said channel having a plurality of openings formed therein, a flexible liner positioned adjacent the inside surfaces of said tank, said liner having flow path means at its exterior surface for directing fluid flow towards said channel, and an epoxy means maintaining said liner in position adjacent the tank.

* * * * *